United States Patent
Seo et al.

(10) Patent No.: US 7,147,835 B2
(45) Date of Patent: Dec. 12, 2006

(54) OXIDE POWDER FOR DIELECTRICS, METHOD OF MANUFACTURING OXIDE POWDER FOR DIELECTRICS, AND MULTI-LAYER CERAMIC CAPACITOR USING THE SAME

(75) Inventors: Dong Hwan Seo, Kyungki-do (KR); Kang Heon Hur, Kyungki-do (KR); Sung Hyung Kang, Kyungki-do (KR); Jin Yung Ryu, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 262 days.

(21) Appl. No.: 10/888,592

(22) Filed: Jul. 12, 2004

(65) Prior Publication Data

US 2005/0223943 A1    Oct. 13, 2005

(30) Foreign Application Priority Data

Mar. 31, 2004    (KR) .................... 10-2004-0022415

(51) Int. Cl.
*C01F 1/00* (2006.01)
*C01F 11/00* (2006.01)
*C01F 17/00* (2006.01)
*C01G 23/00* (2006.01)
*H01G 4/06* (2006.01)

(52) U.S. Cl. ................. 423/598; 423/594.16; 423/263; 423/69; 423/21.1; 423/155; 361/321.1; 361/321.2; 361/321.3; 361/321.4; 361/321.5; 501/136; 501/137; 501/138; 501/139

(58) Field of Classification Search ............ 423/593.1, 423/598, 594.16, 263, 69, 21.1, 155; 361/321.1, 361/321.2, 321.3, 321.4, 321.5; 501/136, 501/137, 138, 139
See application file for complete search history.

(56) References Cited

U.S. PATENT DOCUMENTS

| | | | |
|---|---|---|---|
| 5,188,993 A | * | 2/1993 | Takahashi et al. .......... 501/136 |
| 5,204,031 A | * | 4/1993 | Watanabe et al. ........... 264/656 |
| 6,485,701 B1 | * | 11/2002 | Miyoshi .................. 423/594.9 |
| 6,692,721 B1 | * | 2/2004 | Hur et al. ................... 423/598 |
| 6,728,094 B1 | * | 4/2004 | Nakaya et al. ........... 361/321.2 |
| 6,733,740 B1 | * | 5/2004 | Costantino et al. ......... 423/598 |
| 6,800,270 B1 | * | 10/2004 | Nomura et al. ............. 423/598 |
| 6,939,822 B1 | * | 9/2005 | Konaka et al. ............. 501/137 |

FOREIGN PATENT DOCUMENTS

| | | |
|---|---|---|
| JP | 2001-316114 | 11/2001 |
| JP | 2002-060219 | 2/2002 |
| JP | 2002-234769 | 8/2002 |
| JP | 2002-265278 | 9/2002 |

OTHER PUBLICATIONS

US 7,041,269, 05/2006, Shirakawa et al. (withdrawn)*

* cited by examiner

*Primary Examiner*—Timothy C. Vanoy
(74) *Attorney, Agent, or Firm*—Lowe Hauptman & Berner, LLP.

(57) ABSTRACT

Disclosed herein is a small particle oxide powder for dielectrics. The oxide powder has a perovskite structure, an average particle diameter [D50(μm)] of 0.3 μm or less, a particle size distribution of the average particle diameter within 3%, a particle size distribution satisfying a condition D99/D50<2.5, a content of OH⁻ groups of 0.2 wt % and a C/A axial ratio of 1.006 or more. A method of manufacturing the oxide powder comprises the steps of mixing $TiO_2$ particles and a compound solved with at least one element represented by A of the perovskite structure of $ABO_3$; drying and pulverizing the mixture of $TiO_2$ and the compound; calcining the pulverized mixture; adding the oxide containing the elements of the site A to the coated $TiO_2$ particles and wet-mixing, drying and pulverizing; primarily calcining and pulverizing the pulverized powder under vacuum; and secondarily calcining and pulverizing the powder.

11 Claims, No Drawings

OXIDE POWDER FOR DIELECTRICS, METHOD OF MANUFACTURING OXIDE POWDER FOR DIELECTRICS, AND MULTI-LAYER CERAMIC CAPACITOR USING THE SAME

RELATED APPLICATIONS

The present application is based on, and claims priority from, Republic of Korea Application Ser. No. 2004-22415, filed Mar. 31, 2004, the disclosure of which is hereby incorporated by reference herein in its entirety.

BACKGROUND OF THE INVENTION

1. Field of the Invention

The present invention relates to an oxide powder for dielectrics, which can be used for a dielectric material, a method of manufacturing the oxide powder for the dielectrics, and a multi-layer ceramic capacitor comprising the dielectrics made using the oxide powder. More particularly, the present invention relates to an oxide powder for dielectrics having a perovskite structure made by a solid synthesis method, a method of manufacturing the oxide powder for the dielectrics, and a multi-layer ceramic capacitor comprising the dielectrics made using the oxide powder.

2. Description of the Related Art

An oxide of a perovskite structure, such as $BaTiO_3$ or the like, has been generally used as a dielectric material for electronic components.

As an example of the electronic components using the oxide of the perovskite structure as the dielectric material, there is a multi-layer ceramic capacitor (MLCC).

When manufacturing the multi-layer ceramic capacitor, after sheets of dielectric layers are typically formed with internal electrodes therein by a printing method using internal electrode pastes, the sheets are laminated into multi-layers. Then, the internal electrodes and the dielectric layers in the multi-layers are sintered, and formed with external electrodes connected to the internal electrodes, thus imparting capacitance. Finally, in order to prevent problems from occurring in soldering, Ni and Sn layers are plated thereon, respectively.

With recent advances in high performance and miniaturization of electronic components, demands for miniaturization and increase in capacitance of the multi-layer ceramic capacitor have been increased.

As for a representative method for the miniaturization and increase in capacitance of the multi-layer ceramic capacitor, it has been attempted to decrease the thickness of the dielectric ceramic layer.

In order to decrease the thickness of dielectric ceramic layers, it is required to provide an oxide of a smaller particle diameter to an extent that at least 6~7 particles can be contained in a dielectric ceramic layer. That is, in order to attain the miniaturization and the increase in capacitance of the multi-layer ceramic capacitor, it is needed to provide the oxide having the perovskite structure, such as $BaTiO_3$ or the like, of the smaller particle diameter while having a high dielectric constant.

A method of manufacturing the oxide of the perovskite structure can be generally classified into the solid synthesis method and a wet method.

Generally, when the oxide of the perovskite structure, such as $BaTiO_3$ powder, is made by the solid synthesis method, it is very difficult to control the particle size of the powder.

That is, there is a difficulty in producing the oxide powder of the perovskite structure having a smaller particle diameter with the solid synthesis method.

Meanwhile, in case of the wet method, although the oxide powder of the perovskite structure having the smaller particle diameter can be produced, there are problems in that manufacturing costs are high and in that the produced oxide powder has a remarkably low ferroelectricity and a low Curie Temperature.

Since the oxide powder produced by the wet method has a low C/A axial ratio (Tetragonality) of 1.005 or less, the dielectric constant is low.

Further, the oxide powder produced by the wet method contains 0.1~3.0 wt % of $OH^-$ anion groups therein and defects such as pores, leading to reduction in density of the powder and finally reducing reliability of MLCC products.

An example of the method of manufacturing the oxide powder of a smaller particle diameter having the perovskite structure is set forth in Japanese Patent Laid-open Publication No. 2002-060219.

In Japanese Patent Laid-open Publication No. 2002-060219, $BaTiO_3$ powder of the perovskite structure having a smaller particle diameter is synthesized by mixing a Ba-based hydroxide aqueous solution and a Ti-based hydroxide aqueous solution using the wet method, such as a hydrothermal synthesis method and a hydrolysis method.

According to the method disclosed in Japanese Patent Laid-open Publication No. 2002-060219, the $BaTiO_3$ powder of a particle diameter of 0.2 μm level can be produced.

However, in the $BaTiO_3$ powder, there are problems in that the oxide contains the $OH^-$ anion groups of about 0.1~3.0 wt % and the defects, such as pores, in the particles.

When the defects are present in the powder, the powder has a low density and a decreased crystallinity. Further, the C/A axial ratio is also low, so that the oxide has the perovskite structure, such as cubic $BaTiO_3$.

Thus, when manufacturing the oxide powder of the perovskite structure with a smaller particle diameter using the method of Japanese Patent Laid-open Publication No. 2002-060219, there are problems in that a sufficient ferroelectricity is not exhibited, the reliability is decreased, and the manufacturing costs are increased.

As an example of the solid synthesis method, a method of manufacturing the oxide powder of the perovskite structure, for example, $BaTiO_3$, is set forth in Japanese Patent Laid-open Publication No. 2002-234769.

In the method disclosed in Japanese Patent Laid-open Publication No. 2002-234769, the $BaTiO_3$ powder with a smaller particle size is synthesized through an improved mixing process, which uses titanium oxide ($TiO_2$) and barium carbonate ($BaCO_3$) of a mono-disperse particle size and a large specific surface area, respectively.

The method synthesizes the $BaTiO_3$ powder of the perovskite structure using the solid synthesis method, so that factors of the defects, such as pores, in the particle are thoroughly removed and so that the manufacturing costs are reduced.

However, in case of the method disclosed in Japanese Patent Laid-open Publication No. 2002-234769, although the powder having a particle size of 0.2 μm or less can be produced, intermediate phases, such as $Ba_2TiO_4$ or $BaTi_3O_7$, additionally remain in the powder.

Thus, in order to remove the intermediate phases, the powder should be calcined at a high temperature of 1,200° C. or more, or calcined by controlling a molar ratio of the materials.

However, when the powder is calcined at a high temperature of 1,200° C. or more as described above, even though a high crystallinity of the powder can be attained, grain growth occurs, making it difficult to provide the monodisperse BaTiO$_3$ having a particle size distribution of D99/D50<4.0 and having an average particle diameter of 0.2 μm or less.

The term "D50" means a diameter of a particle in the 50th percentile of the volumes of particles within powders, and the term "D99" means a diameter of a particle in the 99th percentile of the volumes of particles within powders.

SUMMARY OF THE INVENTION

The present invention has been made to solve the above problems, and it is an object of the present invention to provide an oxide powder for dielectrics of a perovskite structure having a small particle size, which satisfies all conditions of a narrow particle size distribution range, a low content of OH$^-$ groups, a large C/A axial ratio and a high Curie Temperature.

It is another object of the present invention to provide a method of manufacturing the oxide powder for the dielectrics having the perovskite structure using a solid synthesis method.

It is yet another object of the present invention to provide a multi-layer ceramic capacitor comprising the dielectrics manufactured using the oxide powder for the dielectrics of the present invention.

In accordance with an aspect of the present invention, the above and other objects can be accomplished by the provision of an oxide powder for dielectrics having a perovskite structure represented by the formula ABO$_3$ (where A is at least one element selected from rare earth elements or elements having valences of 2, B is Ti, and O is oxygen), wherein the oxide powder for the dielectrics is synthesized by a solid synthesis method; and wherein the oxide powder has an average particle diameter [D50(μm)] of 0.3 μm or less, a particle size distribution of the average particle diameter within 3%, a particle size distribution satisfying a condition D99/D50<2.5, a content of OH$^-$ groups of 0.2 wt % or less and a C/A axial ratio of 1.006 or more.

In accordance with another aspect of the present invention, the above and other objects can be accomplished by the provision of a method of manufacturing an oxide powder of dielectrics having a perovskite structure represented by the formula ABO$_3$ (where A is at least one element selected from rare earth elements or elements having valences of 2, B is Ti, and O is oxygen), comprising the steps of: a) mixing TiO$_2$ particles and a compound solved with at least one element represented by A in ABO$_3$ of the perovskite structure; b) drying and pulverizing a mixture of the TiO$_2$ particles and the compound to make a powder; c) calcining the pulverized powder under vacuum to allow an oxide containing the elements represented by A of the perovskite structure to be coated on surfaces of the TiO$_2$ particles; d) adding the oxide containing the elements represented by A of the perovskite structure to the coated TiO$_2$ particles such that a ratio of the elements represented by A of the perovskite structure to Ti (that is, A/Ti) is 0.995~1.025 mol %, followed by wet-mixing, drying and pulverizing; e) primarily calcining the pulverized powder under vacuum, followed by pulverizing; and f) secondarily calcining the primarily calcined and pulverized powder, followed by pulverizing the secondarily calcined powder to the oxide powder.

In accordance with yet another aspect of the present invention, there is provided a multi-layer ceramic capacitor comprising a plurality of dielectric ceramic layers, internal electrodes formed between the dielectric ceramic layers and external electrodes electrically connected to the internal electrodes, wherein the dielectric layers are made of the oxide powder for the dielectrics of the present invention.

DESCRIPTION OF THE PREFERRED EMBODIMENTS

The present invention will now be described in detail.

An oxide powder of the present invention is produced by a solid synthesis method. The oxide powder has a perovskite structure represented by the formula ABO$_3$ (where A is at least one element selected from rare earth elements or elements having valences of 2, B is Ti, and O is oxygen).

The oxide powder for the dielectrics of the present invention has an average particle diameter [D50(μm)] of 0.3 μm or less, preferably 0.05~0.3 μm, and has a particle size distribution of the average particle diameter within 3% and a particle size distribution satisfying the condition of D99/D50<2.5.

The oxide powder of the present invention has a content of OH$^-$ groups of 0.2 wt % or less and a C/A axial ratio of 1.006 or more, more preferably 1.006~1.009.

A method of manufacturing the oxide powder for the dielectrics of the present invention will now be described.

Preferably, the present invention is applied to the method of manufacturing the oxide powder for the dielectrics having the perovskite structure represented by the formula ABO$_3$ (where A is at least one element selected from rare earth elements or elements having valences of 2 and B is Ti). As for proper elements represented by A in the formula ABO$_3$ of the perovskite structure, Ba, Ca, Dy and Y can be proposed.

At the first step for producing the oxide powder of the present invention, TiO$_2$ particles and a compound solved with at least one element represented by A in the perovskite structure are mixed.

As for the compound solved with at least one element represented by A, preferably, there is suggested a compound of alkoxide and nitrate, which can be easily dispersed in an aqueous solution. As an example of the compound, there can be suggested a compound represented by the formula (Me, Re)—(NO$_3$)—H$_2$O (where Me=Ba or Ca, and Re=Dy or Y).

As for TiO$_2$ particles, it is desirable that each of the particles has a specific surface area of 10.0 m$^2$/g or more and a particle size distribution satisfying the condition of D99/D50<4.0.

Preferably, the compound solved with at least one element represented by A in ABO$_3$ is added in an amount of 0.01~6.0 mol %, more particularly 0.7~5.0 mol %.

If the added amount of the compound is excessively high, it is difficult to secure a desired C/A axial ratio.

Mixing can be preferably performed using a medium dispersion apparatus and a high-pressure dispersion apparatus.

As the next step, a mixture of the TiO$_2$ particles and the compound is dried and pulverized, forming powder.

Then, the pulverized powder is calcined under vacuum, such that the oxide containing the elements represented by A of the perovskite structure can be coated on surfaces of TiO$_2$ particles.

As for the oxide containing the element represented by A, there can be suggested BaO$_2$, BaTiO$_2$, CaO$_2$, CaTiO$_3$, BaCO$_3$, CaCO$_3$, BaO, CaO, etc.

When calcining the powder, it is desirable that the vacuum pressure is in the range of 10~0.001 Torr and that a calcination temperature is in the range of 400° C.~600° C.

When the vacuum pressure is excessively high, the material as a coating agent is not completely analyzed, so that detrimental effects are provided when controlling a final molar ratio, which will be determined later. When the vacuum pressure is excessively low, there is a problem in that the material to be coated on the $TiO_2$ particles is not present as a component of a desired shape. Thus, it is desirable that the vacuum pressure is set in the range of 10~0.001 Torr.

When the calcination temperature is excessively low, the material as the coating agent is not completely analyzed, so that detrimental problems occur when controlling the final molar ratio to be determined later. When the calcination temperature is excessively high, there is a problem in that due to growth of the coated $TiO_2$, calcined particles of a desired shape cannot be obtained. Thus, it is desirable that the calcination temperature is set in the range of 400° C.~600° C.

Next, after the oxide containing the elements represented by A is added to the coated $TiO_2$ particles such that the ratio of the elements represented by A in $ABO_3$ to Ti (that us, A/Ti) is in the range of 0.995~1.025 mol %, preferably 1.000 mol %, wet-mixing, drying and pulverizing follow.

As for the oxide containing the elements represented by A, $BaCO_3$, $CaCO_3$, $Dy_2O_3$, etc. having a purity of 99.9% or more and a specific surface area of 15 $m^2/g$ or more are preferably used.

Mixing of the oxide containing the element represented by A and the coated $TiO_2$ particle are preferably performed using a medium dispersion apparatus and a high-pressure dispersion apparatus.

The pulverized powder is primarily calcined under vacuum, and pulverized.

When primarily calcining the powder, it is desirable that the vacuum pressure is in the range of 1~0.001 Torr and the calcination temperature is in the range of 750° C.~850° C.

When the vacuum pressure is excessively high in the primary calcination, there is problem in that the calcined powder does not have the perovskite structure. When the vacuum pressure is excessively low, there is a problem in that the calcined powder of a desired size is not obtained. Thus, it is desirable that the vacuum pressure of the primary calcination is set in the range of 1~0.001 Torr.

When the calcination temperature is excessively low in the primary calcination, there is a problem in that the synthesis of the powder is not completed, while when the calcination temperature is excessively high, there is a problem in that due to the growth of particles, calcined particles of a desired size are not obtained. Thus, the primary calcination temperature is preferably set in the range of 700° C.~850° C.

After the primarily synthesized powder is wet-mixed using the medium dispersion apparatus and the high-pressure dispersion apparatus, the powder is dried and pulverized.

Pulverizing is preferably performed by a dry pulverizing method.

At the last step, the pulverized primarily calcined powder is secondarily calcined and pulverized into the oxide powder of the perovskite structure.

Preferably, the secondary calcination temperature is in the range of 1,000° C.~1,100° C.

When the secondary calcination temperature is excessively low, there is a problem in that intermediate phases or undesirable second phases are formed in the synthesized powder, while when the secondary calcination temperature is excessively high, there is a problem in that calcined powder of a desired size is not obtained. Thus, the secondary calcination temperature is preferably in the range of 1,000° C.~1,100° C.

Preferably, the secondary calcination is performed under a vacuum pressure in the range of about 1~0.001 Torr.

The oxide powder for the dielectrics produced by the present invention has an average particle diameter [D50 (μm)] of 0.3 μm or less, a particle size distribution of the average particle diameter within 3%, a particle size distribution satisfying the condition D99/D50<2.5, a content of $OH^-$ groups of 0.2 wt % or less, a C/A axial ratio of 1.006 or more, and a perovskite structure.

The present invention provides a multi-layer ceramic capacitor, which is made more thinly using the oxide powder for the dielectrics of the perovskite structure.

The present invention will now be described in detail with reference to examples.

COMPARATIVE EXAMPLE 1

An oxide of a perovskite structure was synthesized using a general solid method.

$BaCO_3$ having a purity of 99.9% or more and a specific surface area of 15 $m^2/g$ as a starting material was wet-mixed with $TiO_2$ particles of specific surfaces areas of 10, 25 and 40 $m^2/g$, respectively. The mixtures were dried and pulverized by a dry pulverizing method. Then, the pulverized mixtures were heat-treated at 1,000° C., 1,050° C. and 1,100° C., respectively, synthesizing the oxide of the perovskite structure.

The particle diameter, particle size distribution and C/A axial ratio of the synthesized oxide were measured. The results are shown in Table 1.

TABLE 1

| Starting material | Specific surface area of $TiO_2$ | D99/D50 of material | Mixing method | Heat treatment temperature (° C.) | D50 (μm) | D99/D50 | C/A | Synthesis |
|---|---|---|---|---|---|---|---|---|
| $BaCO_3$ | 10 $m^2/g$ | 3.5 | Heat treatment after mixing | 1,000 | 0.73 | 4.3 | 1.003 | X |
| | | | | 1,050 | 0.88 | 4.7 | 1.005 | X |
| | | | | 1,100 | 1.01 | 5.2 | 1.007 | X |
| | 25 $m^2/g$ | 3.1 | | 1,000 | 0.38 | 4.1 | 1.004 | X |
| | | | | 1,050 | 0.48 | 4.5 | 1.007 | X |
| | | | | 1,100 | 0.61 | 4.8 | 1.008 | X |

TABLE 1-continued

| Starting material | Specific surface area of $TiO_2$ | D99/D50 of material | Mixing method | Heat treatment temperature (° C.) | D50 (μm) | D99/D50 | C/A | Synthesis |
|---|---|---|---|---|---|---|---|---|
| | 40 m²/g | 2.1 | | 1,000 | 0.51 | 4.4 | 1.007 | X |
| | | | | 1,050 | 0.62 | 4.6 | 1.008 | X |
| | | | | 1,100 | 0.73 | 4.8 | 1.009 | X |

As shown in Table 1, when using the general solid method, the oxide of the perovskite structure, that is, the $BaTiO_3$ powder, has D50(μm) much more than 0.3 μm and D99/D50 much more than 2.5.

That is, when using the general solid method, it is difficult to produce an oxide, which concurrently satisfies all conditions, such as D50(μm) of 0.3 μm or less, D99/D50 less than 2.5 and the C/A axial ratio of 1.000 or more.

Further, there exist second phases as well as the perovskite structure (assuming that the synthesis is successful when 99.9 vol % or more perovskite structure is formed).

That is, there exist intermediate phases, such as $Ba_2TiO_4$ or $BaTi_3O_7$ of 1 vol % or more.

COMPARATIVE EXAMPLE 2

$BaCO_3$ having a purity of 99.9% or more and a specific surface area of 15 m²/g as the starting material was wet-mixed with $TiO_2$ particles having specific surface areas of 10, 25 and 40 m²/g using a medium dispersion apparatus and a high-pressure dispersion apparatus (manufactured by Micro-Fluidizer). The mixtures were dried and pulverized by a dry pulverizing method. Then, the pulverized mixtures were heat-treated at 1,000° C., 1,050° C. and 1,100° C., respectively, synthesizing the oxide of the perovskite structure.

Comparative Example 2 is different from Comparative Example 1 in that dispersion properties of $BaCO_3$ and $TiO_2$ are enhanced using the medium dispersion apparatus and the high-pressure dispersion apparatus.

The particle diameter, particle size distribution and C/A axial ratio of the synthesized oxide were measured. The results are shown in Table 2 as follows.

As shown in Table 2, when the medium dispersion apparatus and the high-pressure dispersion apparatus are used in the wet-mixing method, an oxide with a 100% perovskite structure was synthesized.

However, the synthesized $BaTiO_3$ powder have D50(μm) exceeding 0.3 μm or less and D99/D50 exceeding 2.5.

COMPARATIVE EXAMPLE 3

$BaCO_3$ having a purity of 99.9% or more and a specific surface area of 15 m²/g or more as the starting material was wet-mixed with $TiO_2$ particles having specific surface areas of 10, 25 and 40 m²/g with the medium dispersion apparatus and the high-pressure dispersion apparatus (manufactured by Micro-Fluidizer). The mixtures were dried and pulverized by a dry pulverizing method. Then, the powder was primarily synthesized by heat treatment at 800° C.

After the primarily synthesized powder was wet-mixed using the medium dispersion apparatus and the high-pressure dispersion apparatus, the powder was dried and pulverized by the dry pulverizing method. The pulverized powder was secondarily heat-treated at 1,000° C., 1,050° C. and 1,100° C., synthesizing the oxide of the perovskite structure.

Comparative Example 3 is different from Comparative Example 2 in that a secondary calcination step is included in the synthesis method.

The particle diameter, particle size distribution and C/A axial ratio of the synthesized oxide were measured. The results are shown in Table 3 as follows.

TABLE 2

| Starting material | Specific surface area of $TiO_2$ | D99/D50 of material | Mixing method | Heat treatment temperature (° C.) | D50 (μm) | D99/D50 | C/A | Synthesis |
|---|---|---|---|---|---|---|---|---|
| $BaCO_3$ | 10 m²/g | 3.5 | Heat treatment after mixing with a high-pressure dispersion equipment | 1,000 | 0.42 | 3.6 | 1.005 | ○ |
| | | | | 1,050 | 0.45 | 3.3 | 1.009 | ○ |
| | | | | 1,100 | 0.52 | 3.2 | 1.013 | ○ |
| | 25 m²/g | 3.1 | | 1,000 | 0.37 | 4.1 | 1.007 | ○ |
| | | | | 1,050 | 0.42 | 3.9 | 1.012 | ○ |
| | | | | 1,100 | 0.47 | 3.5 | 1.013 | ○ |
| | 40 m²/g | 2.1 | | 1,000 | 0.33 | 4.2 | 1.007 | ○ |
| | | | | 1,050 | 0.39 | 3.7 | 1.012 | ○ |
| | | | | 1,100 | 0.45 | 3.5 | 1.015 | ○ |

TABLE 3

| Starting material | Specific surface area of TiO$_2$ | D99/D50 of material | Primary calcining process | Heat treatment temperature (° C.) | D50 (μm) | D99/D50 | C/A | Synthesis |
|---|---|---|---|---|---|---|---|---|
| BaCO$_3$ | 10 m$^2$/g | 3.5 | Pulverizing after primary synthesis at 800° C. | 1,000 | 0.37 | 2.9 | 1.007 | ○ |
| | | | | 1,050 | 0.43 | 3.0 | 1.011 | ○ |
| | | | | 1,100 | 0.46 | 3.1 | 1.015 | ○ |
| | 25 m$^2$/g | 3.1 | | 1,000 | 0.32 | 3.3 | 1.009 | ○ |
| | | | | 1,050 | 0.36 | 3.1 | 1.012 | ○ |
| | | | | 1,100 | 0.38 | 2.9 | 1.015 | ○ |
| | 40 m$^2$/g | 2.1 | | 1,000 | 0.27 | 3.1 | 1.006 | ○ |
| | | | | 1,050 | 0.31 | 3.2 | 1.007 | ○ |
| | | | | 1,100 | 0.35 | 3.3 | 1.015 | ○ |

As shown in Table 3, when the secondary calcination step was included in the synthesis method, an oxide with a 100% perovskite structure was synthesized.

However, the majority of the synthesized BaTiO$_3$ powder has D50(μm) more than 0.3 μm, and D99/D50 more than 2.5.

COMPARATIVE EXAMPLE 4

As shown in Table 4, BaCO$_3$, CaCO$_3$ and Dy$_2$O$_3$ having a purity of 99.9% or more and a specific surface area of 15 m$^2$/g as starting materials were wet-mixed with TiO$_2$ particles having specific surface areas of 10, 25 and 40 m$^2$/g, using the medium dispersion apparatus and the high-pressure dispersion apparatus (manufactured by Micro-Fluidizer). The mixtures were dried and pulverized with the dry pulverizing method. The powder was primarily synthesized by the heat treatment at 800° C.

After the primarily synthesized powder was wet-mixed using the medium dispersion apparatus and the high-pressure dispersion apparatus, the powder was dried and pulverized by the dry pulverizing method. The pulverized powder was secondarily heat-treated at 1,000° C., 1,050° C. and 1,100° C., synthesizing the oxide of the perovskite structure.

The particle diameter, particle size distribution and C/A axial ratio of the synthesized oxide were measured. The results are shown in Table 4 as follows.

As shown in Table 4, when the secondary calcination was included in the synthesis, an oxide with the 100% perovskite structure was synthesized.

Although the majority of the synthesized BaTiO$_3$ powder has D50(μm) of 0.3 μm or less, it has D99/D50 of 2.5 or more.

COMPARATIVE EXAMPLE 5

As shown in Table 5, TiO$_2$ particles of different specific surface areas as the starting material were mixed with a compound of alkoxide and nitrate (Ba, Ca) (NO$_3$)$_2$—H$_2$O of 0.5~5 mol %, which can be easily dispersed in an aqueous solution, and heat-treated at 400~600° C.

The heat-treated TiO$_2$ particles were mixed with BaCO$_3$, CaCO$_3$ and Dy$_2$O$_3$ having a purity of 99.9% or more and a specific surface area of 15 m$^2$/g or more, respectively, with the medium dispersion apparatus and the high-pressure dispersion apparatus (manufactured by Micro-Fluidizer). Then, the mixtures were dried and pulverized with the dry pulverizing method. The powder was primarily synthesized at 800° C.

After the primarily synthesized powder was wet-mixed with the medium dispersion apparatus and the high-pressure dispersion apparatus, the powder was dried and pulverized by the dry pulverizing method. The pulverized powder was secondarily heat-treated at 1,000° C., 1,050° C. and 1,100° C., synthesizing the oxide of the perovskite structure.

The particle diameter, particle size distribution and C/A axial ratio of the synthesized oxide were measured. The results are shown in Table 5 as follows.

TABLE 4

| Adding agent of 1 mol % | Specific surface area of TiO$_2$ | D99/D50 of material | Adding method of additional adding agent | Heat treatment temperature (° C.) | D50 (μm) | D99/D50 | C/A | Synthesis |
|---|---|---|---|---|---|---|---|---|
| CaCO$_3$ | 10 m$^2$/g | 3.5 | Adding agent of 1 mol % is added when primary mixing | 1,000 | 0.25 | 3.4 | 1.006 | ○ |
| | | | | 1,050 | 0.31 | 3.1 | 1.008 | ○ |
| | | | | 1,100 | 0.38 | 2.8 | 1.011 | ○ |
| Dy$_2$O$_3$ | 25 m$^2$/g | 3.1 | | 1,000 | 0.21 | 3.3 | 1.003 | ○ |
| | | | | 1,050 | 0.25 | 2.7 | 1.005 | ○ |
| | | | | 1,100 | 0.32 | 2.6 | 1.009 | ○ |
| CaCO$_3$ + Dy$_2$O$_3$ | 40 m$^2$/g | 2.1 | | 1,000 | 0.15 | 3.3 | 1.002 | ○ |
| | | | | 1,050 | 0.17 | 3.1 | 1.003 | ○ |
| | | | | 1,100 | 0.21 | 2.9 | 1.005 | ○ |

TABLE 5

| Material | Coating Coating amount (mol %) | Specific surface area of TiO$_2$ (m$^2$/g) | Heat treatment temperature (° C.) | Primary calcination temperature (° C.) | Secondary calcination temperature (° C.) | D50 (μm) | D99/D50 | C/A |
|---|---|---|---|---|---|---|---|---|
| Ba | 0.5 | 10 | 400 | 750 | 1,050 | 0.23 | 3.4 | 1.003 |
|  | 2.5 | 25 | 500 | 800 | 1,100 | 0.13 | 3.1 | 1.000 |
|  | 5.0 | 40 | 600 | 850 | 1,000 | 0.10 | 2.6 | 1.000 |
| Ca | 0.5 | 25 | 400 | 750 | 1,000 | 0.21 | 3.7 | 1.005 |
|  | 2.5 | 25 | 500 | 800 | 1,100 | 0.17 | 2.8 | 1.003 |
|  | 5.0 | 25 | 600 | 850 | 1,050 | 0.15 | 2.6 | 1.000 |
| Dy | 0.5 | 25 | 400 | 750 | 1,050 | 0.26 | 3.5 | 1.003 |
|  | 2.5 | 25 | 500 | 800 | 1,100 | 0.21 | 2.9 | 1.002 |
|  | 5.0 | 40 | 600 | 850 | 1,000 | 0.12 | 2.7 | 1.000 |
| Ba + Ca | 0.5 | 10 | 400 | 750 | 1,050 | 0.21 | 3.8 | 1.004 |
|  | 2.5 | 25 | 500 | 800 | 1,100 | 0.13 | 2.9 | 1.001 |
|  | 5.0 | 25 | 600 | 850 | 1,000 | 0.11 | 2.7 | 1.000 |
| Ba + Dy | 0.5 | 10 | 400 | 750 | 1,050 | 0.24 | 3.7 | 1.002 |
|  | 2.5 | 25 | 500 | 800 | 1,100 | 0.15 | 3.2 | 1.002 |
|  | 5.0 | 40 | 600 | 850 | 1,050 | 0.10 | 3.1 | 1.000 |

As shown in Table 5, according to Comparative Example 5, the oxide with the 100% perovskite structure could be synthesized.

Although the synthesized BaTiO$_3$ powder has D50(μm) of 0.3 μm or less, it has D99/D50 of 2.5 or more.

INVENTIVE EXAMPLE

As shown in Table 6, after TiO$_2$ particles of different specific surface areas as starting materials were wet-mixed with 0.5~5 mol % of a compound of alkoxide and nitrate (Ba, Ca)(NO$_3$)$_2$—H$_2$O, which can be easily dispersed in an aqueous solution, the mixtures were heat-treated at 400~600° C. in a calcination furnace under a vacuum pressure of 10~0.001 Torr. The primarily heat-treated TiO$_2$ particles were mixed with BaCO$_3$, CaCO$_3$ and Dy$_2$O$_3$ having a purity of 99.9% or more and a specific surface area of 15 m$^2$/g or more, respectively, with the medium dispersion apparatus and the high-pressure dispersion apparatus (manufactured by Micro-Fluidizer). Then, the mixtures were dried and pulverized by the dry pulverizing method. The pulverized powder was heat-treated at 750~850° C. in the cacination furnace under a vacuum pressure of 1~0.001 Torr to synthesize a primary oxide.

After the primarily synthesized oxide was wet-mixed using the medium dispersion apparatus and the high-pressure dispersion apparatus, the powder was dried and pulverized by the dry pulverizing method. The pulverized powder was calcined at 1,000° C., 1,050° C. and 1,100° C., synthesizing the oxide of the perovskite structure.

The particle diameter, particle size distribution and C/A axial ratio, content of OH$^-$ of the synthesized oxide were measured. The results are shown in Table 6.

TABLE 6

| Material | Coating Coating amount (mol %) | Specific surface area of TiO$_2$ (m$^2$/g) | Heat treatment Temp. (° C.) | Primary calcination Temp. (° C.) | Secondary calcination Temp. (° C.) | D50 (μm) | D99/ D50 | C/A | Content of OH$^-$ (wt %) |
|---|---|---|---|---|---|---|---|---|---|
| Ba | 0.5 | 10 | 400 | 750 | 1,050 | 0.15 | 2.4 | 1.007 | 0.01 |
|  | 2.5 | 25 | 500 | 800 | 1,100 | 0.11 | 2.3 | 1.008 | 0.01 |
|  | 5.0 | 40 | 600 | 850 | 1,000 | 0.05 | 2.5 | 1.006 | 0.01 |
| Ca | 0.5 | 25 | 400 | 750 | 1,000 | 0.21 | 2.5 | 1.007 | 0.01 |
|  | 2.5 | 25 | 500 | 800 | 1,100 | 0.17 | 2.4 | 1.008 | 0.01 |
|  | 5.0 | 25 | 600 | 850 | 1,050 | 0.13 | 2.5 | 1.006 | 0.01 |
| Dy | 0.5 | 25 | 400 | 750 | 1,050 | 0.26 | 2.4 | 1.008 | 0.01 |
|  | 2.5 | 25 | 500 | 800 | 1,100 | 0.21 | 2.3 | 1.009 | 0.01 |
|  | 5.0 | 40 | 600 | 850 | 1,000 | 0.06 | 2.2 | 1.008 | 0.01 |
| Ba + Ca | 0.5 | 10 | 400 | 750 | 1,050 | 0.21 | 2.5 | 1.007 | 0.01 |
|  | 2.5 | 25 | 500 | 800 | 1,100 | 0.13 | 2.4 | 1.007 | 0.01 |
|  | 5.0 | 25 | 600 | 850 | 1,000 | 0.11 | 2.1 | 1.008 | 0.01 |
| Ba + Dy | 0.5 | 10 | 400 | 750 | 1,050 | 0.24 | 2.5 | 1.006 | 0.01 |
|  | 2.5 | 25 | 500 | 800 | 1,100 | 0.15 | 2.4 | 1.007 | 0.01 |
|  | 5.0 | 40 | 600 | 850 | 1,050 | 0.06 | 2.4 | 1.008 | 0.01 |

As shown in Table 6, according to the present invention, the synthesized oxide powder of the perovskite structure has an average particle diameter D50(μm) capable of being controlled in the range of 0.05~0.3 μm, a particle size distribution satisfying the condition D99/D50<2.5, OH$^-$ groups of 0.2 wt % or less, and the tetragonal structure of a C/A axial ratio of 1.006~1.009.

As described above, in accordance with the present invention, there is provided an oxide powder of the perovskite structure having an average particle diameter of 50~300 nm, the narrow particle size distribution of the average particle diameter being within 3% (for example, 150 nm±4.5 nm), the particle size distribution satisfying the condition D99/D50<2.5, the content of OH⁻ groups of 0.2 wt % or less and the C/A axial ratio of 1.006~1.009.

It should be understood that the embodiments and the accompanying drawings as described above have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. An oxide powder for dielectrics having a perovskite structure represented by the formula $ABO_3$ (where A is at least one element selected from rare earth elements or elements having valences of 2, B is Ti, and O is oxygen),
   wherein the oxide powder for the dielectrics is synthesized by a solid synthesis method; and
   the oxide powder has an average particle diameter [D50 (μm)] of 0.3 μm or less, a particle size distribution of the average particle diameter being within 3%, a particle size distribution satisfying a condition D99/D50<2.5, a content of OH⁻ groups of 0.2 wt % or less and a C/A axial ratio of 1.006 or more.

2. The oxide powder as set forth in claim 1, wherein the element represented by A in $ABO_3$ of the perovskite structure is at least one element selected from the group of Ba, Ca, Dy and Y.

3. The oxide powder as set forth in claim 1, wherein the powder has an average particle diameter [D50(μm)] of 0.05~0.3 μm and a C/A axial ratio of 1.006~1.009.

4. A method of manufacturing an oxide powder for dielectrics having a perovskite structure represented by the formula $ABO_3$ (where A is at least one element selected from rare earth elements or elements having valences of 2, B is Ti, and O is oxygen), comprising the steps of:
   a) mixing $TiO_2$ particles and a compound solved with at least one element represented by A in $ABO_3$ of the perovskite structure;
   b) drying and pulverizing a mixture of the $TiO_2$ particles and the compound to form powder;
   c) calcining the pulverized powder under vacuum to allow an oxide containing the elements represented by A to be coated on surfaces of the $TiO_2$ particles;
   d) adding the oxide containing the elements represented by A to the coated $TiO_2$ particles such that a ratio of the elements to Ti (that is, A/Ti) is in the range of 0.995~1.025 mol %, followed by wet-mixing, drying and pulverizing;
   e) primarily calcining the powder from the step d) under vacuum, followed by pulverizing; and
   f) secondarily calcining the primarily calcined and pulverized powder, followed by pulverizing the secondarily calcined powder to synthesize the oxide powder for the dielectrics.

5. The method as set forth in claim 4, wherein the element represented by A of the perovskite structure is at least one element selected from the group of Ba, Ca, Dy and Y.

6. The method as set forth in claim 4, wherein the step f) is carried out under vacuum.

7. The method as set forth in claim 4, wherein each of the $TiO_2$ particles has a specific surface area of 10.0 m²/g or more and a particle size distribution satisfying a condition D99/D50<4.0.

8. The method as set forth in claim 4, wherein the compound solved with at least one element represented by A in $ABO_3$ of the perovskite structure comprises a compound of alkoxide and nitrate capable of being easily dispersed in an aqueous solution.

9. The method as set forth in claim 4, wherein the compound solved with at least one element represented by A in $ABO_3$ of the perovskite structure is added in an amount of 0.01~6.0 mol %.

10. The method as set forth in claim 4, wherein the oxide containing the compound solved with at least one element represented by A in $ABO_3$ has a specific surface area of 15 m²/g or more.

11. A multi-layer ceramic capacitor comprising a plurality of dielectric ceramic layers, internal electrodes formed between the dielectric ceramic layers and external electrodes electrically connected to the internal electrodes,
   wherein the dielectric layers are made of the oxide powder for the dielectrics according to claim 1.

\* \* \* \* \*